(12) United States Patent
Berry

(10) Patent No.: US 6,910,442 B2
(45) Date of Patent: Jun. 28, 2005

(54) METHOD AND APPARATUS FOR DISPENSING FOOD GRANULES IN AQUARIUM TO MINIMIZE CONTAMINATION OF WATER FILTRATION SYSTEM

(76) Inventor: Robert J. Berry, Box 6122, 6801 E. Stagecoach Pass, Carefree, AZ (US) 85377

( * ) Notice: Subject to any disclaimer, the term of this patent is extended or adjusted under 35 U.S.C. 154(b) by 0 days.

(21) Appl. No.: 10/452,520

(22) Filed: Jun. 2, 2003

(65) Prior Publication Data
US 2004/0237900 A1 Dec. 2, 2004

(51) Int. Cl.[7] ............................................. A01K 61/02
(52) U.S. Cl. .................................................. 119/51.04
(58) Field of Search ........................ 119/51.01, 51.04

(56) References Cited

U.S. PATENT DOCUMENTS

| | | | | |
|---|---|---|---|---|
| 1,976,962 A | * | 10/1934 | Pape | 119/51.04 |
| 2,727,489 A | * | 12/1955 | Sklar | 119/51.04 |
| 2,966,885 A | * | 1/1961 | Bentley | 119/51.04 |
| 3,464,386 A | * | 9/1969 | Baker | 119/51.04 |
| 3,688,907 A | * | 9/1972 | Oravec | 210/169 |
| 3,993,028 A | * | 11/1976 | Baensch et al. | 119/51.04 |
| 4,089,299 A | * | 5/1978 | Suchowski | 119/51.04 |

* cited by examiner

Primary Examiner—Teri Pham Luu
Assistant Examiner—Kimberly S. Smith
(74) Attorney, Agent, or Firm—Tod R. Nissle, P.C.

(57) ABSTRACT

Food dispensing apparatus minimizes the likelihood that food particles dispensed into an aquarium will contaminate the water filtration system or will stick to the sides of the aquarium. The food dispensing system suspends a hollow food dispensing member in water in the aquarium such that the food dispensing member guides food to the bottom of the aquarium free from being transported by prevailing currents in the aquarium.

1 Claim, 3 Drawing Sheets

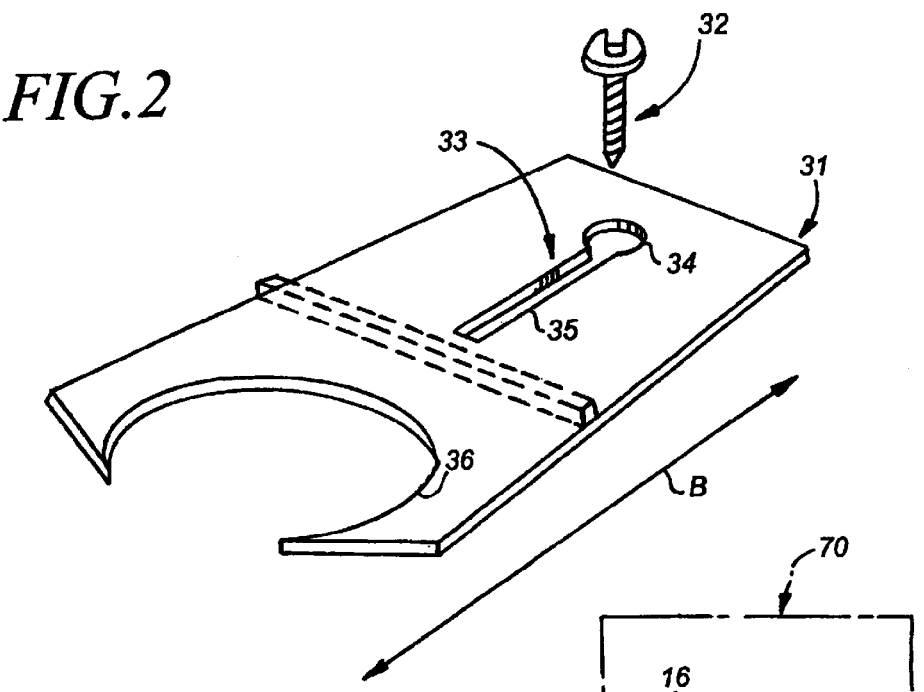
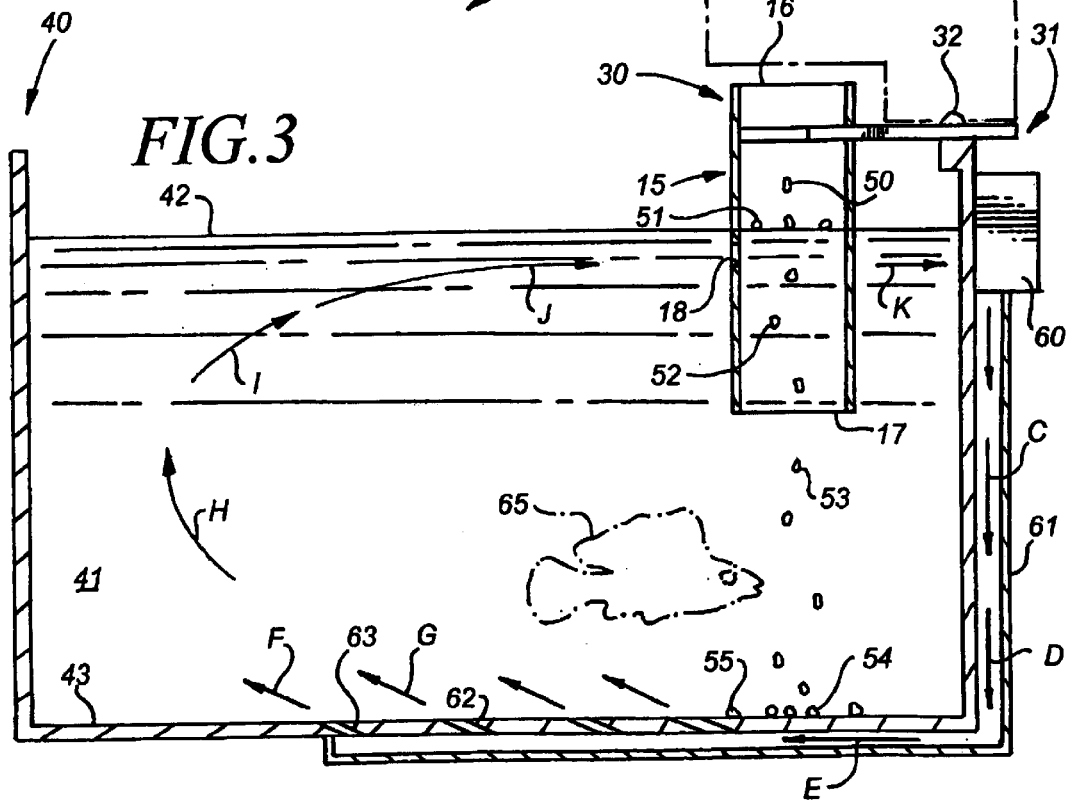

METHOD AND APPARATUS FOR DISPENSING FOOD GRANULES IN AQUARIUM TO MINIMIZE CONTAMINATION OF WATER FILTRATION SYSTEM

This invention pertains to a method and apparatus for dispensing food in an aquarium.

More particularly, this invention pertains to a method and apparatus for dispensing food to salt water fish in an aquarium.

In a further respect, the invention relates to a method and apparatus to minimize the likelihood that the dispensed food will enter and contaminate the water filtration system of the aquarium.

In a further respect, the invention pertains to a method and apparatus for dispensing food in an aquarium to insure that the food sinks to the bottom of the aquarium without being collected by the filtration system of the aquarium, and without adhering to the sides of the aquarium.

When salt water or fresh water fish are maintained in an aquarium, the fish often are fed in typical fashion by broadcasting food particles or granules on the surface of the water in the aquarium. Fresh water fish often consume food floating on the surface of the water. In contrast, salt water fish feed below the surface and off the bottom.

An aquarium ordinarily includes a tank filled with water and includes a filtration system. The filtration system skims water from the tank, filters the water, and returns the water to the tank. Food particles or granules that are not consumed by fish in the aquarium and that remain on the surface of the water in the aquarium tend to be skimmed by the filtration system. These particles function to contaminate and obstruct the filter and filtration system. In some cases, surface tension and the buoyancy of the food particles will maintain the particles on the surface of the water even after the food particles have become water logged. Another problem associated with food particles distributed on the surface of water is that prevailing currents in the aquarium can displace food particles against the sides of the aquarium, where surface tension facilitates the "capture" of the food particles by the sides of the aquarium. The food particles tend to stick to the sides.

Accordingly, it would be highly desirable to provide an improved method and apparatus for dispensing food in an aquarium, which method and apparatus would reduce the likelihood that the food would contaminate the filter system of the aquarium, or adhere to the inner side surfaces of the aquarium.

Therefore, it is a principal object of the instant invention to provide an improved method and apparatus for feeding fish.

Another object of the invention is to provide an improved method and apparatus for dispensing in an aquarium food that fish consume below the surface and off the bottom of the aquarium.

A further object of the invention is to provide an improved method and apparatus for decreasing the time required for food on the surface of water in the aquarium to sink to the bottom of the aquarium.

Still another object of the invention is to use prevailing currents in the aquarium to facilitate the submersion of food broadcast on the water and to minimize the likelihood that the current will carry the food into the filter system of the aquarium or into contact with the sides of the aquarium.

These and other, further and more specific objects and advantages of the invention will be apparent from the following detailed description of the invention, taken in conjunction with the drawings, in which:

FIG. 2 is a perspective view illustrating a component utilized in an alternate food dispensing apparatus constructed in accordance with the invention;

FIG. 3 is a side view illustrating an aquarium equipped with food dispensing apparatus constructed in accordance with the invention and further illustrating the mode of operation thereof; and, FIG. 4 is a side view illustrating an alternate mode of operation of the apparatus of FIG. 1.

Briefly, in accordance with my invention, I provide an improved apparatus for dispensing food in an aquarium.

The aquarium includes a tank having a bottom; a volume of salt water having an upper surface in the tank; salt water fish; and, a filtration system for removing water from the tank, filtering the water, and returning the water to the tank.

The improved apparatus reduces the likelihood that food dispensed in the aquarium will enter the filtration system. The apparatus includes a support member extending outwardly into the tank; and, a hollow dispensing member extending from above, through, and to a selected depth beneath the surface of the salt water.

In an alternate embodiment of the invention, I provide an improved method for dispensing food to fish in an aquarium.

The aquarium includes a tank having a bottom, water having an upper surface in the tank, fish, a filtration system for removing water from the tank, filtering the water, and returning the water to the tank.

The improved method includes the steps of providing a support member shaped and dimensioned to be mounted on the tank to extend outwardly into the tank, and of providing a hollow dispensing member shaped and dimensioned to be mounted on the support member and to extend from above, through, and to a selected depth beneath the surface of the water.

The method also includes the steps of mounting the support member on the tank such that the support member extends into the tank; mounting the dispensing member on the support member such that the support member extends from above, through, and to a selected depth beneath the surface of the water; and, dispensing food into the dispensing member such that the food falls downwardly through the dispensing member to the bottom of the aquarium.

Figure 1:
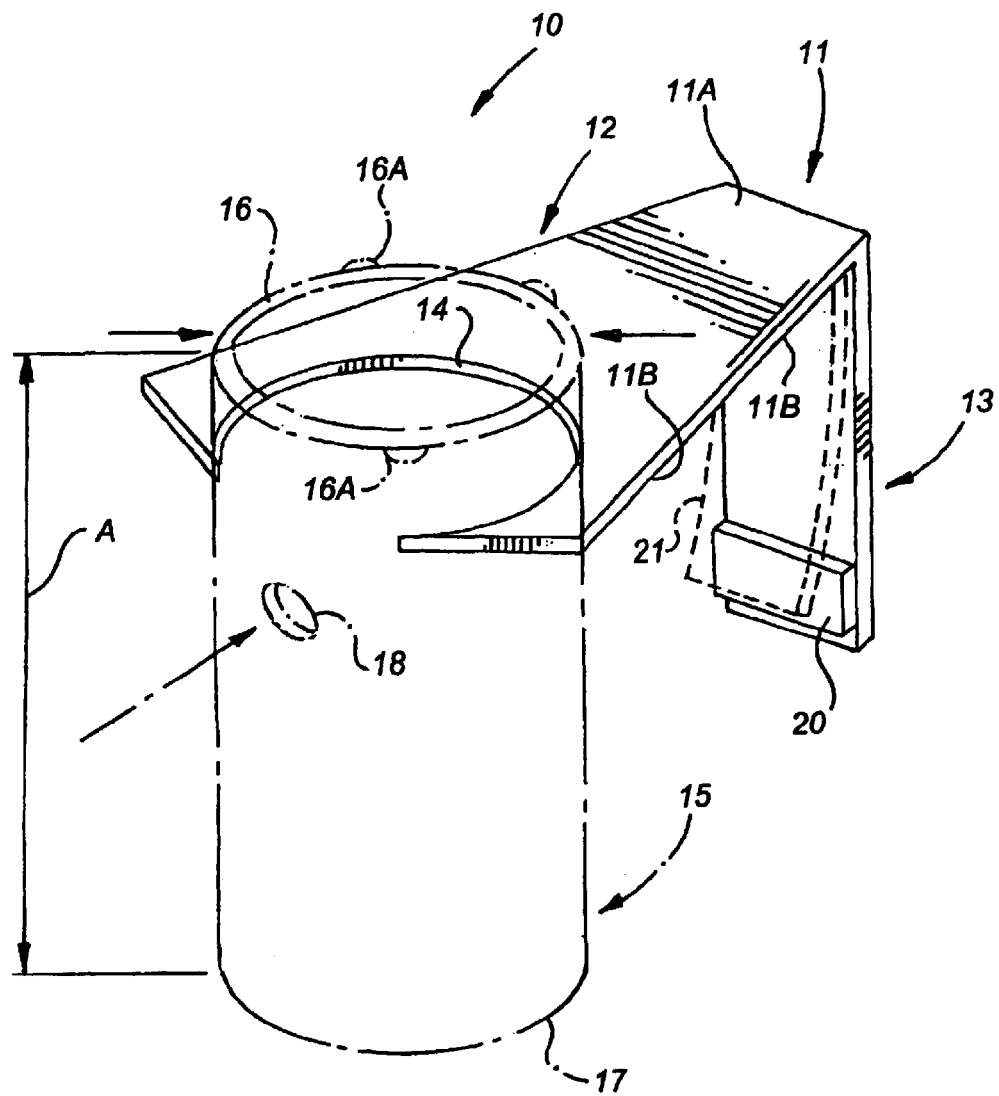
FIG. 1 is a perspective view illustrating food dispensing apparatus constructed in accordance with the invention.

Turning now to the drawings, which depict the presently preferred embodiments of the invention for the purpose of illustrating the practice thereof and not by way of limitation of the scope of the invention, and in which like reference characters refer to corresponding elements throughout the several views, FIG. 1 illustrates food dispensing apparatus generally indicated by reference character 10. The apparatus includes a hollow, open-ended, cylindrical dispensing member 15. The shape and dimension of hollow dispensing member 15 can vary as desired.

Holder 11 includes support base 13 and extension support arm 12 attached to and outwardly depending from base 13. Base 13 includes hook Velcro pad that attaches to a loop Velcro (TM) pad (not shown) attached to the outer surface of the side of an aquarium to fix base 13 in place against the aquarium side such that extension support arm 12 extends over the top edge of the side and over the surface of water in the aquarium.

If desired, base 13 can include an additional arcuate arm 21. Arm 21 permits base 13 to function as a clip such that base 13 can be clipped or slid over the top edge of the wall of an aquarium. The aquarium wall slides intermediate base 13 and arm 21. When arm 21 is provided, Velcro pads 20 need not be utilized.

Circular opening 14 in extension support arm 12 frictionally receives and supports hollow dispensing member 15 such that upper circular edge 16 is positioned above the surface of water in the aquarium and such that lower circular edge 17 is positioned beneath the surface of water in the aquarium.

The upper end of member 15 can include small nubs 16A outwardly depending from upper edge 16. Nubs 16 seat on upper surface 11A or bottom surface 11B adjacent opening 14 in the manner illustrated in FIG. 4 and prevent the upper end of member 15 from sliding downwardly through opening 14. In this circumstance, member 15 is removably mounted on support arm 12, 31. If desired, member 15 can be fixedly secured to arm 12, 31.

FIG. 2 illustrates an alternate support extension member 31 that does not require a base 13. Member 31 includes an adjustment component 33 including a slot 35 and contiguous opening 34 each formed through member 31. Member 31 is mounted on the top of an aquarium 40 in the manner illustrated in FIG. 3 by inserting the externally threaded leg of a screw 32 through opening 34, by turning the leg into the top of the aquarium wall, by sliding laterally slot 35 along the leg in the directions indicated by arrows B in FIG. 2 to move member 31 to a desired position such that opening 36 is positioned over the surface 42 of water in aquarium 40, and by tightening screw 32 to secure member 31 in position. Opening 36 is sized to engage frictionally and hold a hollow member 15 in position in the manner illustrated in FIG. 3. If desired, hollow member 15 can be glued or otherwise fastened to opening 36.

In FIG. 3, upper circular edge 16 of hollow dispensing member 15 is positioned above the surface 42 of water in the aquarium 40, lower circular edge 17 is position beneath the surface of water in the aquarium 40, and member 15 extends through the surface 42 of the water in the aquarium 40.

The filtration system of aquarium 40 includes apertures 62 formed in the bottom or floor 43 of aquarium 40. The filtration system removes water 41 from aquarium 40, filters the water, and returns the water to the aquarium 40. A filter—pump 60 draws water from the surface 42. Filter-pump 60 can be located in water 41, or can be outside water 41 at some other location in, adjacent, or remote from aquarium 40. Filtered water travels though conduit 61 in the directions of travel indicated by arrows C to E, and travels through apertures 62 back into the aquarium in the manner indicated by arrows F and G. The prevailing current flow in aquarium 40 is induced by the filtration system and is indicated by arrows F to K.

An opening or openings 18 can be formed in one or more sides of hollow member 15. Opening 18 permits a portion of the prevailing current to flow through opening 18 into member 15 to produce eddy currents and turbulence in member 15. Such eddy currents and turbulence function to agitate the surface of water in member 15 to accelerate the wetting and/or sinking of food particles that are on the water surface. When member 15 is installed in an aquarium, opening 18 can be positioned beneath surface 42, or can extend partially above surface 42, as desired. Opening 18 is positioned in the water 41 such that a portion of the prevailing current in the aquarium 40 flows through opening 18 into member 15 and facilitates the sinking of food particles downwardly through member 15.

Food dispensing apparatus 30 in FIG. 3 includes hollow dispensing member 15 and support extension member 31.

The extension member 12, 31 in the food dispensing apparatus of the invention can be shaped and dimensioned such that member 12, 31 (and opening 14, 36) extends partially or completely beneath surface 42 of water in an aquarium 40. Base 13 can be secured to the inside of the wall of an aquarium and can be partially or completed submerged beneath surface 42 of water in the aquarium 40.

In use, food dispensing apparatus 30 is mounted on an aquarium 40 in the manner illustrated in FIG. 3. Food particles 50 are manually sprinkled into member 15 such that the particles fall onto the surface of water in member 15. The particles 51 on the surface of water in member 15 often float on the surface for a period of time, but eventually become waterlogged and sink. Or, the food particle may have sufficient weight to sink immediately or soon after falling on the water surface. Food particles 52 sink under gravity downwardly through member 15 and exit the lower end 17 of member 15.

Particles 53 that exit end 17 preferably fall into a volume of water 41 in aquarium 40 that is substantially free of a prevailing current F to K. This minimizes the likelihood that the current will carry food particles upwardly toward surface 42 to be captured by filter—pump 60. Or, if the particles 53 fall through a volume of water through which the prevailing current passes, the current preferably facilitates carrying the particles 53 to bottom 43, or, the current is not strong enough to carry the particles back to member 15 or to be captured by filter—pump 60.

Particles 53 that exit the lower end 17 of member 15 normally continue to fall downwardly to a resting place on the bottom 43 of the aquarium. Food particles 54, 55 on the bottom 43 are consumed by fish 65.

Lower end 17 is positioned at least two and one-half inches below the surface 42 of water 41, is preferably positioned at least three inches below surface 42, and is most preferably positioned at least four inches below surface 42. Such positioning of end 17 is important because if end 17 is too near surface 42, food particles 53 that move downwardly and exit end 17 can be more readily captured by a current and carried back up to surface 42. As particles 53 descend downwardly through water 41, the rate of descent slows due to the increased pressure exerted against particles 53 by water 41.

End 17 is at least four inches from the bottom 43, preferably at least six inches from bottom 43. This permits fish to position themselves beneath 17 to ingest food particles 53 exiting end 17.

The inner diameter or width of tube 15 can vary as desired, but is preferably at least one inch. If the inner diameter of tube 15 is too small, the surface tension of the water tends to capture food particles 50 and to prevent the particles 50 from sinking.

Opening 18 is preferably at least one inch below the surface 42 of water 41, and is preferably no more than about two inches below surface 42 of water 41. If opening 18 is too close to surface 42, food particles 18 that escape outwardly through opening 18 can move back up to surface 42. The size of opening 18 can vary, but is presently one-quarter inch to three-quarters of an inch wide. Another auxiliary opening (not shown) can be formed in tube 15 opposite that of and in horizontal alignment with opening 18. Tube 15 is then positioned in its holder 11, 31 such that opening 18 and the auxiliary opening are in alignment with a current J flowing toward and through said openings.

The food dispensing apparatus 10, 30 of the invention can be utilized in fresh water and salt water aquariums, but is specially adapted for salt water aquariums. Salt water fish typically feed below the surface of water 41 and feed off the bottom of the aquarium. Fresh water fish feed at the surface of water 41, feed below the surface of water 41, and/or feed of the bottom of the aquarium.

Apparatus 70 that periodically, automatically dispenses food particles into an aquarium is well known. If desired, such apparatus can be utilized in conjunction with the food dispensing apparatus 10, 30 of the invention by mounting the automatic feeding apparatus 70 in the manner illustrated in FIG. 3 such that the apparatus 70 dispenses food directly into the upper end 16 of hollow member 15.

Figure 4:
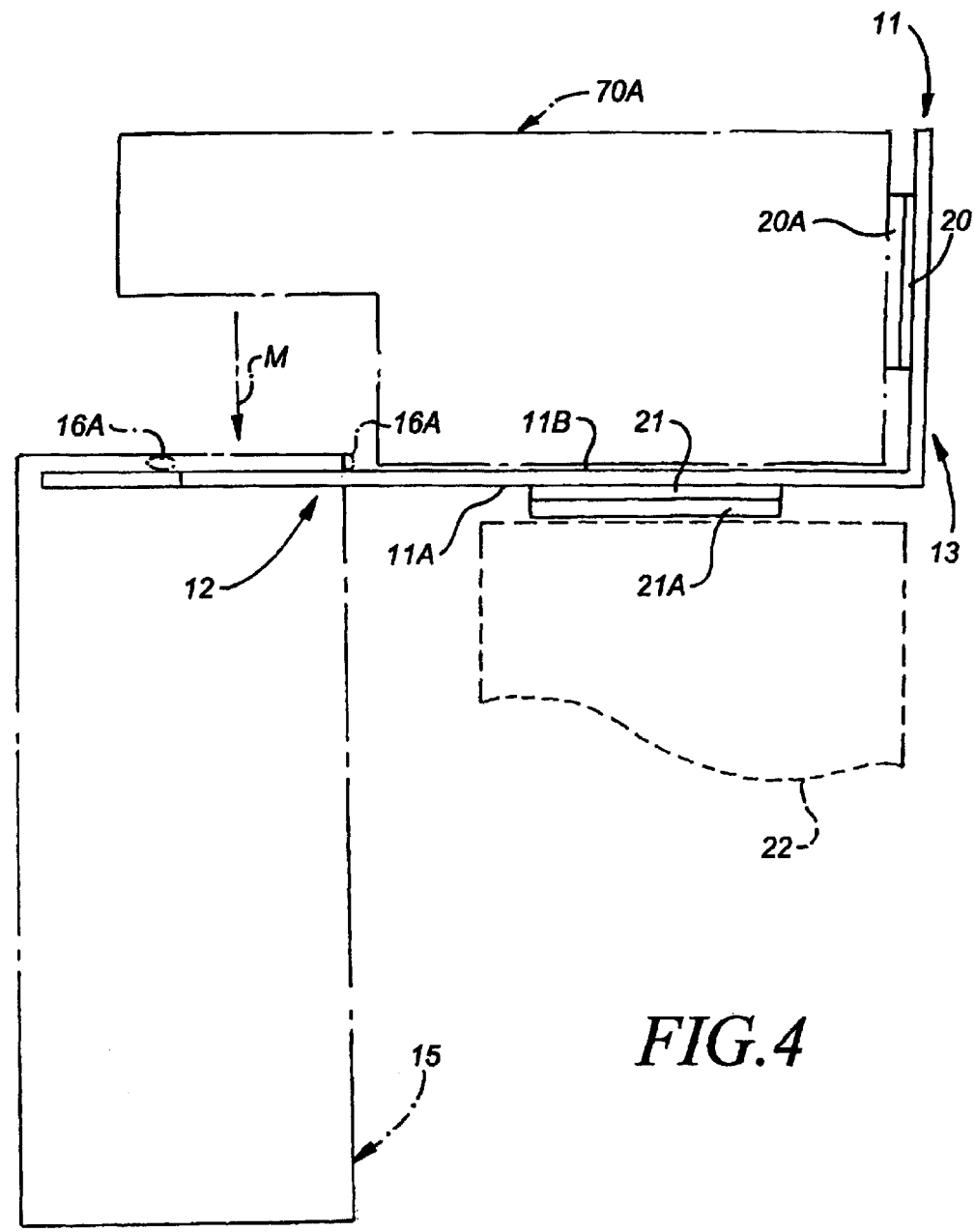

FIG. 4 illustrates an alternate embodiment of the invention in which holder 11 is inverted from its normal orientation illustrated in FIG. 1. Velcro (TM) hook and loop pads 21, 21A are attached to surface 11A and aquarium wall 22, respectively, to secure holder 11 in place. Velcro hook and loop pads 20 and 20A are attached to base 13 and automatic fish food dispenser 70A, respectively, to secure the food dispenser 70A in place. Dispenser 70A dispenses food into the upper end of member 15 in the direction of arrow M in conventional fashion.

Member 15 can, if desired, be mounted on a holder that floats on water 41. It is presently preferred, however, that member 15 remain in a fixed position to insure that member 15 is sufficiently spaced apart from filter 60 and to insure that opening 18 is in proper alignment with current J in water 41.

Member 15 (and the remained of apparatus 10) can be constructed from any desired material. The presently preferred material for member 15 is, however, a lightweight plastic or some other material whose buoyancy in water causes the downward force exerted on arm 12, 31 to be negligible or non-existent.

Having described my invention in such terms as to enable those of skill in the art to make and practice it, and having described the presently preferred embodiments thereof, I claim:

1. A method for dispensing food to fish in an aquarium, the aquarium including
   a tank having a bottom and at least one side,
   a volume of water having an upper surface in the tank, fish,
   a filtration system for removing water from the tank, filtering the water, and returning the water to the tank,
   a prevailing current induced by the filtration system,
the method including the steps of
   (a) providing
      (i) a support member shaped and dimensioned to be mounted on the tank and to extend outwardly from the side of the tank,
      (ii) a hollow dispensing member including an opening and shaped and dimensioned to be mounted on said support member and to extend
         from above,
         past, and
         to a selected depth beneath a portion of the surface of the water, said portion of the surface of water being located inside said dispensing member;
   (b) mounting said support member on said tank such that said support member extends outwardly from the side of the tank;
   (c) mounting said dispensing member on said dispensing member such that
      (i) said support member extends from above, past, and to a selected depth beneath said portion of the surface of the water, and
      (ii) at least a portion of the prevailing current flows through said opening into said dispensing member and creates turbulence that agitates said portion of the surface of the water in said dispensing member;
   (d) dispensing food into said dispensing member such that said food falls onto said portion of the surface of the water and sinks through said dispensing member to the bottom of the aquarium, said agitation of said portion facilitating the sinking of the food from said portion of the surface of the water and through said dispensing member to the bottom of the aquarium.

* * * * *